United States Patent [19]

Hofmann et al.

[11] Patent Number: 4,986,607
[45] Date of Patent: Jan. 22, 1991

[54] WHEEL MOUNT FOR DRIVEN WHEELS

[75] Inventors: Heinrich Hofmann, Schweinfurt; Manfred Tröster, Bad Kissingen, both of Fed. Rep. of Germany

[73] Assignee: FAG Kugelfischer Georg Schafer (KGaA), Fed. Rep. of Germany

[21] Appl. No.: 468,589

[22] Filed: Jan. 23, 1990

[30] Foreign Application Priority Data

Mar. 4, 1989 [DE] Fed. Rep. of Germany ....... 3902141

[51] Int. Cl.⁵ .............................................. B60B 35/18
[52] U.S. Cl. ........................... 301/124 R; 301/105 R; 384/506; 384/537
[58] Field of Search ............... 301/105 R, 111, 124 R, 301/124 H, 125, 126, 131; 464/906, 145; 384/504, 505, 506, 537, 544; 180/258, 259

[56] References Cited

U.S. PATENT DOCUMENTS

| 1,448,312 | 3/1923 | Nauts | 301/131 X |
| 4,433,877 | 2/1984 | Colanzi | 384/544 |
| 4,537,270 | 8/1985 | Brandenstein et al. | 180/259 X |

FOREIGN PATENT DOCUMENTS 3239121 8/1984 Fed. Rep. of Germany.

Primary Examiner—Russell D. Stormer
Attorney, Agent, or Firm—Ostrolenk, Faber, Gerb & Soffen

[57] ABSTRACT

A wheel mount for driven wheels including an axially inner hub and an axially outward outer part. A first row of rolling elements rolling about the periphery of the hub and a second row of rolling elements rolling about the periphery of a pivot journal projecting from the outward part into the bore of the hub. In the bore of the hub is a circumferential array of axially extending, obliquely radially outwardly inclined teeth. A fastening journal from the outward part projects into the bore axially past the oblique teeth. The fastening journal is plastically deformable to define a deformed bead which engages in the toothing in the bore of the hub to provide a rotation lock between the hub and the outward part. The bore of the hub and the periphery of the fastening journal also are stepped complementary for axially fixing them in form locked manner.

6 Claims, 1 Drawing Sheet

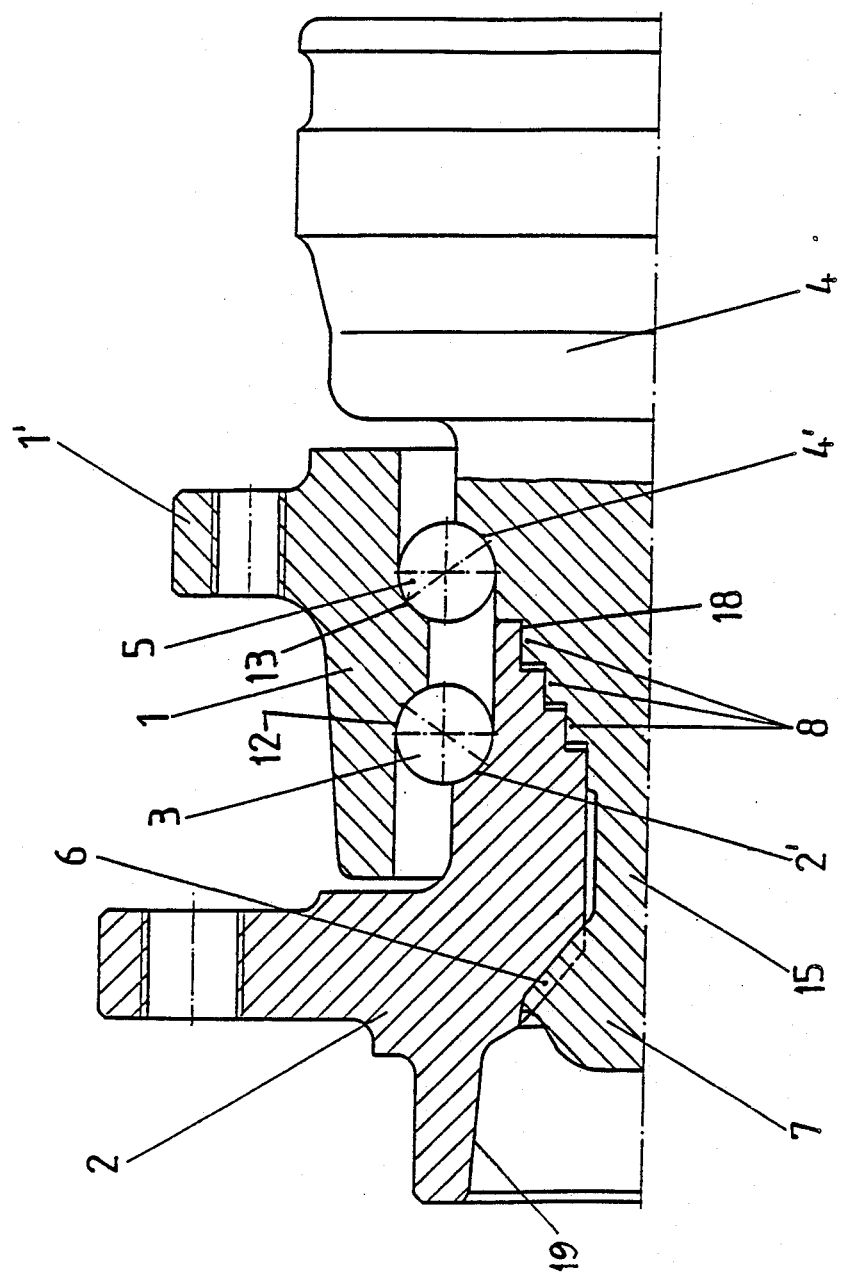

WHEEL MOUNT FOR DRIVEN WHEELS

BACKGROUND OF THE INVENTION

The present invention relates to a wheel mount for holding a hub on a journal. The journal is on a separate outer part, which is connected to the hub by the journal projecting into the bore of the hub and being secured there.

A wheel mount of the type indicated is known from European Pat. No. 59 339. In that case, the bore of the hub is provided with internal teeth, and there is impressed into the teeth of the hub an intermediate disk which is also provided with teeth, and that disk is screwed via a nut onto the attachment journal. This produces an expensive unit, including a large number of parts, and it is not reliable due to the possibility of the nut loosening.

SUMMARY OF THE INVENTION

The object of the present invention is to improve a wheel mount so that, in the case of a so-called three-ring bearing or a bearing for a driven wheel, a reliable play-free connection between the hub and the axially outer part is simply obtained which can be subject to a high load with respect to flexural moment and torque.

The wheel mount is comprised of axially inward and outward parts, where the latter may be a hub for the wheel. In the bore of the hub is an obliquely radially outwardly inclined, circumferential array of teeth. A fastening journal or pin from the inward part projects into the bore of the hub at least up to the array of teeth. At least at the teeth, the fastening journal is plastically deformable and is deformed outwardly into engagement with the teeth of the array, securing the hub and the inward part for rotation together.

An outer ring extends around the hub and the inward part where they meet. The outer ring defines races for two rows of rolling elements, one rolling in a race around the hub and the other in a race around the inward part.

Because a bead produced by plastic deformation of the fastening journal is impressed into the obliquely oriented toothing of the hardened hub, the connection can withstand a high load and is able to withstand such a load through the use of simple means. The deforming bead flows deeply into the free spaces between the hardened teeth, depending upon the magnitude of the deformation forces applied. As a result, a good form locked attachment results so that the hub and the inward part rotate together without slippage.

Since the interengaging parts, and particularly the teeth, which the bead engages, are large and numerous, no return of the deformed bead from the deformation can take place, even upon the occurrence of impacts, so that the attachment between the hub and the inward part is reliable. Furthermore, upon the plastic deformation of the bead, no gap can be produced between the teeth of the hub and the bead, producing a play-free attachment in the circumferential as well as in the axial directions. The fastening journal can have a large cross-section so as to cooperate with the holding bead which can be made relatively large, to provide a connection between the hub and the inward part which assures attachment that can withstand a high load.

This attachment can be further increased in a preferred embodiment by a stepped journal located inside the hub to define a centering arrangement as is provided in the region of the place of separation between the hub and the inward part. See copending U.S. Application No. 461,227, filed Jan. 5, 1990, entitled "Welded Connection for Wheel Bearing Unit for Motor Vehicles", by Hofmann, et al. The steps are located axially inward of the oblique toothing and the steps widen radially in the direction opposite the direction toward which the oblique toothing widens. In this manner, the bead cooperates with the toothing to secure the hub and the journal axially. In addition to the necessary centering of the parts, this measure provides an additional fastening of the parts on each other if, as is customary, there is a force-fit of the parts in the region of the steps of that arrangement. These steps also facilitate the mounting, since the path of, axial displacement of the hub and the inward part with respect to each other is substantially reduced upon assembly.

As a whole, the features indicated provide a wheel mount unit which can withstand high loads and can be manufactured and mounted by simple means even though the inner ring of the bearing is in two axially separate parts which each receive one ring of rolling elements. This is important because it permits substantially more rolling elements to be introduced into the bearing than in the case of a one part inner ring. This leads to a high load bearing capacity also at this place. In this way, the high bending and spreading moments which occur, for instance, upon travel of a wheel around curves are reliably transmitted to the hub and the housing. Furthermore, the chamber for the rolling bodies is already sealed before the formation of the bead on the journal.

BRIEF DESCRIPTION OF THE DRAWING

Other objects and features of the invention are described below with reference to the drawing, which shows a partial section through a wheel mount in accordance with the invention.

DETAILED DESCRIPTION OF A PREFERRED EMBODIMENT

The Figure shows a wheel mount. The mount includes a two row outer ring 1 with a radially outwardly projecting fastening flange 1'. On the interior bore of the outer ring 1 are defined two axially spaced apart outer races 12 and 13 respectively, for the ball rows 3 and 5.

An axially inward hub 2 has defined on its axially outward but radially peripheral section a first inner race 2' for a first annular row of bearing balls 3. The hub 2 has an axial bore 19 extending through it.

The axially inward outer part 4 of a transmission housing has defined on its axially outward but radially peripheral section a second inner race 4' for the second annular row of bearing balls 5, which is spaced axially inward from the first row of balls 3 and inward from the end of the hub 2. The axially outer part 4 has an axially outwardly projecting, pin shaped, fastening journal 15 which projects through the bore 19 of the hub.

The hub 2 has a hardened toothing 6 inside its bore surface 19 toward the axially outward end and axially outward of the row of bearing balls 3. The toothing 6 comprises a full circumferential array of axially elongate teeth, each of which is obliquely inclined radially outwardly in the axially outward direction to form lock with the journal pin 15, as described below. The fastening journal pin 15 extends axially to the toothing 6 and at least the portion of the journal 15 at the toothing is plastically deformable.

Upon the final mounting step, after the journal 15 is inserted into the hub bore 19, a bead 7 is formed by plastic deformation of the end of the plastically deformable fastening journal 15. The bead is forced outward to extend in part into the free spaces between the teeth of the toothing 6. This produces a rotation preventing, form-locked connection and also an extraction preventing connection between the part 4 and the hub 2.

Between the hub 2 and the journal pin 15 there is furthermore provided a centering arrangement 8 having three steps of progressively greater outer diameter in the radially outward direction. There are complementary shape and size steps 18 defined in the bore 19 of the hub 2 for mating with the steps 8 on the part 4. Those steps abut as the parts 2 and 4 are moved axially together. Those steps 8 and 18 are the subject of pending U.S. Application No. 461,227, filed Jan. 5, 1990. This provides precise accurate association and axial placement of the races 2' and 4' with respect to each other and with respect to the two races 12 and 14 defined in the single outer ring 1, which is important for the load bearing capacity of the two row antifriction bearing. Furthermore, the steps cause the parts 2 and 4 to be additionally connected to each other in the radial direction and, upon the required force fit between the complementary steps, also in the axial direction.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A wheel mount for a driven wheel, comprising:
    an axially outward part and an axially inward part;
    the outward part having an outer periphery on which a first inner race for a first row of rolling elements is defined; the outward part having an axial bore therethrough with an internal periphery;
    the inward part including a fastening journal which projects from the inward part axially into the bore of the outward part; the fastening journal having an outer periphery; a second inner race being defined on the outer periphery of the fastening journal at the part of the outer periphery of the fastening journal located axially inward of the outward part; the second inner race being for a second row of rolling elements;
    the fastening journal having an annular, stepped periphery with a plurality of different radius steps defined on it and the bore of the outward part having an annular surface which is stepped complementary to the stepped periphery of the fastening journal, such that with the inward part and the outward part pressed axially together, the complementary steps come into engagement to orient the outward part and the inward part with respect to each other;
    an outer ring around the first and second inner races, the outer ring defining first and second outer races for two respective rows of rolling elements; the first and second outer races overlying the respective inner races;
    a first row of rolling elements between the first inner and outer races; a second row of rolling elements between the second inner and outer races;
    the bore of the outward part including obliquely arranged toothing thereon oriented for defining a connection for fixing the outward part and the inward part for rotation together; the fastening journal being of an axial length to extend out to the oblique toothing of the hub, and the journal being deformed to form a bead at the oblique toothing to engage in the toothing for causing mechanical engagement between the fastening journal and the outward part at the toothing;
    wherein the oblique orientation of the toothing is such that in the direction axially outward into the outward part, the toothing is oriented so as to widen radially outward, thereby enlarging the diameter of the bore of the outward part.

2. The wheel mount of claim 1, wherein the steps on the fastening journal increase in radial dimension opposite the direction of increase of radial dimension of the obliquely inclined toothing on the inner bore of the outward part.

3. A wheel mount for a driven wheel, comprising:
    an axially outward part and an axially inward part;
    the outward part having an outer periphery on which a first inner race for a first row of rolling elements is defined; the outward part having an axial bore therethrough with an internal periphery;
    the inward part including a fastening journal which projects from the inward part axially into the bore of the outward part; the fastening journal having an outer periphery; a second inner race being defined on the outer periphery of the fastening journal at the part of the outer periphery of the fastening journal located axially inward of the outward part; the second inner race being for a second row of rolling elements;
    the fastening journal having an annular, stepped periphery with a plurality of different radius steps defined on it and the inner bore of the outward part having an annular surface which is stepped complementary to the stepped periphery of the fastening journal, such that with the inward part and the outward part pressed axially together, the complementary steps come into engagement to orient the outward part and the inward part with respect to each other;
    an outer ring around the first and second inner races, the outer ring defining first and second outer races for two respective rows of rolling elements; the first and second outer races overlying the respective inner races;
    a first row of rolling elements between the first inner and outer races; a second row of rolling elements between the second inner and outer races;
    the bore of the outward part including obliquely arranged toothing therein oriented for defining a connection for fixing the outward part and the inward part for rotation together; the fastening journal being of an axial length to extend out to the oblique toothing of the hub, and the journal being deformed to form a bead at the oblique toothing to engage in the toothing for causing mechanical engagement between the fastening journal and the outward part at the toothing.

4. The wheel mount of claim 3, wherein the fastening journal is comprised of plastically deformable material in the axial vicinity of the oblique toothing and the fastening journal being plastically deformed in shape for engaging the oblique toothing to provide a fixed connection of the outward part and the inward part for rotation together;

5. The wheel mount of claim 3, wherein the oblique toothing comprises a circumferential array of teeth each extending axially along the inward part.

6. The wheel mount of claim 3, wherein the outward part comprises a hub of a wheel mount for a vehicle.

* * * * *